(12) United States Patent
Osborne

(10) Patent No.: US 8,983,984 B2
(45) Date of Patent: *Mar. 17, 2015

(54) METHODS AND SYSTEMS FOR SIMPLIFYING OBJECT MAPPING FOR EXTERNAL INTERFACES

(71) Applicant: Catavolt, Inc., Alpharetta, GA (US)

(72) Inventor: Glenn W. Osborne, Roswell, GA (US)

(73) Assignee: Catavolt, Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/106,427

(22) Filed: Dec. 13, 2013

(65) Prior Publication Data

US 2014/0108511 A1    Apr. 17, 2014

Related U.S. Application Data

(63) Continuation-in-part of application No. 13/830,667, filed on Mar. 14, 2013, which is a continuation of application No. 12/829,680, filed on Jul. 2, 2010, now Pat. No. 8,423,561.

(60) Provisional application No. 61/736,882, filed on Dec. 13, 2012, provisional application No. 61/222,557, filed on Jul. 2, 2009.

(51) Int. Cl.
*G06F 7/00* (2006.01)
*G06F 17/30* (2006.01)
*H04L 29/08* (2006.01)

(52) U.S. Cl.
CPC .......... *H04L 67/10* (2013.01); *G06F 17/30557* (2013.01); *G06F 17/30569* (2013.01)

USPC .......................... 707/756; 707/802; 707/738

(58) Field of Classification Search
CPC .................... G06F 17/30616; G06F 17/30569
USPC .......................................... 707/738, 756, 802
See application file for complete search history.

(56) References Cited

U.S. PATENT DOCUMENTS

| | | | |
|---|---|---|---|
| 6,061,515 A * | 5/2000 | Chang et al. | 717/114 |
| 6,279,008 B1 | 8/2001 | Tung Ng et al. | |
| 6,301,605 B1 | 10/2001 | Napolitano et al. | |
| 7,426,735 B2 * | 9/2008 | Bliss et al. | 719/310 |

(Continued)

OTHER PUBLICATIONS

Tom Haughey, "Transforming a Logical Data model to a Physcial Database Design—an Overview", Feb. 1, 2006, 5 pages, http://www.tdan.com/view-featured-columns/5389.

(Continued)

*Primary Examiner* — Cam-Y Truong
(74) *Attorney, Agent, or Firm* — DLA Piper LLP US

(57) ABSTRACT

Methods and systems for simplifying object mapping for external interfaces. At least two client requests for action may be received from an external interface wherein each client request may be evaluated sequentially or concurrently in a governed and non-blocking technique. Each client request may be associated to a logical object in order to minimize a representational gap between the client request and a physical object using the logical object. Each query request may be responded to using the object relational mapping in order to simplify the external interface by minimizing the representational gap between the external interface and the physical object using the logical object.

46 Claims, 6 Drawing Sheets

(56) References Cited

U.S. PATENT DOCUMENTS

| | | |
|---|---|---|
| 8,086,998 B2 | 12/2011 | Bansal |
| 2003/0028477 A1* | 2/2003 | Stevenson et al. ............... 705/38 |
| 2004/0030685 A1 | 2/2004 | Helles et al. |
| 2004/0139018 A1* | 7/2004 | Anderson et al. ............... 705/41 |
| 2005/0216508 A1* | 9/2005 | Maria Meijer et al. .... 707/104.1 |
| 2006/0200438 A1* | 9/2006 | Schloming ........................ 707/1 |
| 2006/0229985 A1* | 10/2006 | Lalwani et al. ................. 705/41 |
| 2006/0253771 A1* | 11/2006 | Baschy ........................ 715/500 |
| 2007/0150522 A1 | 6/2007 | Stakutis et al. |
| 2007/0150934 A1* | 6/2007 | Fiszman et al. ................... 726/1 |
| 2007/0226241 A1* | 9/2007 | Ng et al. ....................... 707/102 |
| 2009/0276419 A1 | 11/2009 | Jones et al. |
| 2009/0319544 A1 | 12/2009 | Griffin et al. |
| 2010/0077008 A1 | 3/2010 | Davis et al. |
| 2010/0100952 A1* | 4/2010 | Sample et al. .................... 726/9 |
| 2010/0162004 A1 | 6/2010 | Dodgson et al. |

OTHER PUBLICATIONS

Craig S. Mullins, "Database Design: From Logical to Physical", Jul. 2002, 3 pages, http://www.craigmullins.com/dbta_011.htm.
http://en.wikipedia.org/wiki/Programming_in_the_large_and_programming_in_the_small (3 pages) Updated Nov. 19, 2012.
http://en.wikipedia.org/wiki/Enterprise_service_bus (6 pages) Updated Jan. 4, 2013.
"Recursive Functions of Symbolic Expressions and Their Computation by Machine, Part I," John McCarthy, Massachusetts Institute of Technology, Cambridge, Mass., Apr. 1960, http://www-formal.stanford.edu/jmc/recursive/recursive.html (33 pages).
Abelson et al., "Structure and Interpretation of Computer Programs: Second Edition", The Massachusetts Institute of Technology, pp. 6, 7, 12, 13, 16-19, 62-65, 142, 143, 220, 221, 320, 321, 374-377, 390, 391 652 and 653, Copyright 1996.
U.S. Appl. No. 12/829,680.
U.S. Appl. No. 13/830,667.

* cited by examiner

METHODS AND SYSTEMS FOR SIMPLIFYING OBJECT MAPPING FOR EXTERNAL INTERFACES

CROSS-REFERENCE TO RELATED APPLICATIONS

This application is related to and claims the benefit of U.S. Provisional Application 61/736,882, filed Dec. 13, 2012. This application is also a continuation-in-part of U.S. patent application Ser. No. 13/830,667, filed Mar. 14, 2013, which is a continuation of U.S. patent application Ser. No. 12/829,680, filed Jul. 2, 2010 (now U.S. Pat. No. 8,423,561, Issued Apr. 16, 2013), which, in turn, claims the benefit of U.S. Provisional Application No. 61/222,557, filed Jul. 2, 2009. All of the foregoing are incorporated by reference in their entireties.

DETAILED DESCRIPTION OF SEVERAL EMBODIMENTS

Figure 1:
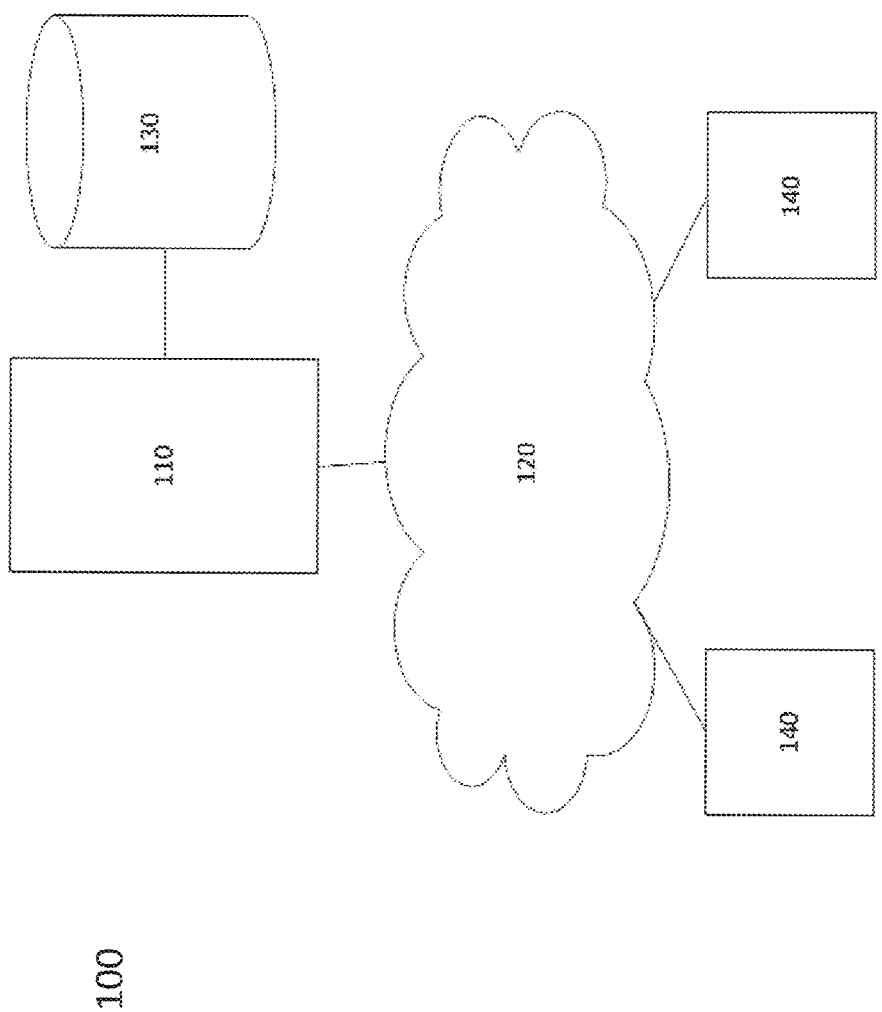
FIG. 1 is a network according to an embodiment of the invention.

Contemporary web service approaches may be based on request/response protocols that send and receive documents, for example third-party scripts. Third-party scripts may commit security and/or resource violations. Systems and methods described herein may enable the safe execution of programs such as third-party scripts. Systems and methods described herein may provide rich interactions based on entity schemas. A lightweight scripting system may allow entity interactions to be composed remotely and then distributed across participating back ends. Each participating back end may implement the scripting system. Original architecture and design may be provided so that a systems programmer can create a compatible scripting system in any application programming language.

The lightweight scripting system may be conversational so that requesters may be able to preserve session state between calls to the scripting engine. The lightweight scripting system may be composable so that it may support programming-in-the-small abstractions that allow for sub-procedures, looping, and building of expressions from other expressions. The lightweight scripting system may be multi-tenant friendly so that it may be fair to Software as a Service (SaaS) environments that house multiple tenants. A tenant may not be able to prevent another tenant from its fair share of resources. The lightweight scripting system may be highly scalable so that it may be sealable to new heights compared to typical enterprise architectures (e.g., 100,000's of concurrent users per process instead of the typical 1,000s of users). The lightweight scripting system may be very low risk so that it may help ensure the basic tenets of security, which are confidentiality, integrity, and availability.

The systems and methods described herein may comprise one or more computers. A computer may be any programmable machine capable of performing arithmetic and/or logical operations. In some embodiments, computers may comprise processors, memories, data storage devices, and/or other commonly known or novel circuits and/or components. These components may be connected physically or through network or wireless links. Computers may also comprise software which may direct the operations of the aforementioned components. Computers may be referred to with terms that are commonly used by those of ordinary skill in the relevant arts, such as servers, PCs, mobile devices, communication devices, and other terms. Computers may facilitate communications between users, may provide databases, may perform analysis and/or transformation of data, and/or perform other functions, it will be understood by those of ordinary skill that those terms used herein are interchangeable, and any computer capable of performing the described functions may be used. For example, though the terms "database" and "server" may appear in the following specification, the disclosed embodiments may not necessarily be limited to databases and/or servers.

Computers may be linked to one another via a network or networks. A network may be any plurality of completely or partially interconnected computers wherein some or all of the computers are able to communicate with one another. It will be understood by those of ordinary skill that connections between computers may be wired in some cases (i.e. via Ethernet, coaxial, optical, or other wired connection) or may be wireless (i.e. via Wi-Fi, WiMax, cellular, satellite, or other wireless connection). Connections between computers may use any protocols, including connection oriented protocols such as TCP or connectionless protocols such as UDP. Any connection through which at least two computers may exchange data may be the basis of a network.

FIG. 1 is a network 100 according to an embodiment of the invention. The network 100 may include one or more computers. For example, the network 100 may include one or more servers 110 which may be configured to provide web services and which may implement application dialog language (ADL) applications 200. An ADL application 200 may be an application or logical/virtual machine that enables execution of large numbers of instructions with minimal resources, as described in greater detail below. The ADL application and related functions may be contained within a single server 110 (e.g., implementation 600 of FIG. 6A) or may interact with functions on other servers 110 (e.g., implementation 650 of FIG. 6B). The ADL application 200 may communicate with other computers via the Internet 120 or other communication networks in some embodiments. The ADL application 200 may include and/or be in communication with a local database 130. One or more client computers 140 may be included in the network 100. These client computers 140 may communicate with the ADL application 200 via the Internet 120 or some other connection.

The scripting systems and methods described herein may introduce an ADL as a lightweight scripting language and the ADL application 200 as an execution environment for the language. Implementations, discussions, and examples presented herein may be based on the Scala programming language, the Java Virtual Machine (JVM), the Akka model of actors, and the libraries of the respective frameworks, although ADL and the ADL application 200 described herein may be used with other languages, models, libraries, etc.

Application Dialog Language

ADL may be a compact, infinitely composable scripting language. ADL may be based on symbolic expressions (s-expressions), which are the foundation of languages like Lisp and Scheme. The atoms, lists, and procedures of ADL may be as follows:

Documentation Conventions

The following documentation conventions may be used to describe variables:

Symbol variables are specified as <symbol>
Number variables are specified as <number> or some subset of the real number space like <integer>
String variables are specified as "<some-variable-name>"
S-expression variables are specified as <s-expr>
Variable lists of strings like ("<value-1>" ... "<value-2>") are specified as <string-list>

Variable names may be descriptive like <days-integer> as opposed to just <integer>.

Atoms

Atoms may be the indivisible building blocks of ADL and may include the following:

Symbol—may be a value that may begin with a letter and may be followed by any character expect <whitespace>, a left parenthesis "(", or a right parenthesis ")",
String—may any set of characters within double quotation marks. A double quotation may be escaped with \" when appearing as part of a string.
Number—may be any numeric expression in decimal format, which may be any string beginning with an optional "-" character, followed by any number of digits 0-9, followed by an optional "." character, followed by an optional sequence of digits 0-9. The value may be parsed by the Scala class scala.math.BigDecimal.
nil or ( )—an empty list that may be used as the second argument of a cons expression, the false value of a boolean expression, or as an indication of "undefined".

The following expression may determine whether an s-expression is an atom, (atom? <s-expr>)

Lists

Data and programs may be specified equivalently as lists of words, numbers, or other lists, separated by whitespace and surrounded by parentheses.

ADL may be based on s-expressions and may be defined inductively as:
1. An atom, or
2. An expression of the form (x . y) where x and y are s-expressions and . is the cons operator.

An abbreviated notation may be used to represent lists in s-expressions, so that x y z) stands for (x . (y . (z. nil)))

The following convenience functions may determine whether an s-expression is a list or an empty list, respectively.

(list? <s-expr>)
(empty? <s-expr>)

Association

An association may be a pair where the first value may be an atom and the second value may be an atom or another s-expr.

(<atom> <s-expr>)

The following convenience function determines whether an s-expr may be an association.

(assoc? <s-expr>)

Association List

An association list (or a-list) may be a data structure used frequently in ADL. An a-list may be a list of pairs (conses); each pair may be an association. The head of a pair may be called the key, and the tail may be called the datum.

Key values may be atoms, but datum values may be an atom or another s-expr.

((<atom-1> <s-expr-1>) ... (<atom-N> <s-expr-N>))

A variable association list may be abbreviated as <a-list>.

Typed List

A typed list (or t-list) may be used to convert object instances between ADL and the JVM. The first element may be a capitalized symbol, and the remaining elements may be one or more s-expressions.

(<Type> <s-expr-1> ... <s-expr-N>)

A typed list may be abbreviated as <t-list>.

Special Forms

Special forms may be different because they may not evaluate in strict applicative order.

| | |
|---|---|
| (and arg1, arg2, ... argN) | At least two arguments are required. Return the last evaluation if all arguments evaluate to non-nil (true) values. Return nil (false) the first time an argument evaluates to nil. This expression short circuits. |
| (begin arg1 ... argN) | Evaluate each argument in order. Return the last evaluation as the value for the begin expression. |
| (cond (p1 e1) ... (pN eN)) | The predicate p1 is evaluated first. If its value is nil (false), then p2 is evaluated. If p2's value is nil, then p3 is evaluated. This process continues until a predicate is found whose value is non nil (true), in which case the interpreter returns the value of the corresponding consequent expression eN of the clause as the value of the conditional expression. If none of the predicates is found to be non nil, the value of cond is nil. |
| (define symOrFormals expr) | Define a variable or a procedure. If symOrFormals is a symbol, then bind into the environment the evaluation of expr at the symbol symOrFormals, otherwise symOrFormals has to be a formal procedure definition where the first symbol is the procedure name and the remaining symbols are the argument names. For example, the expression (factorial n) describes the factorial procedure that takes one argument. The expr argument contains the body of the procedure definition. |
| (if pred conseq alt) | If the pred expression is non nil (true) then evaluate the conseq expression. Otherwise evaluate the alt expression. The alt expression is optional. If alt is not provided, and the pred expression evaluates to false, then nil (undefined) is returned. |

| | |
|---|---|
| (lambda formals body) | Define a closure (ad-hoc procedure) over the current environment. The formals and body are specified under the same rules as the define expression. Here's an example expression (map (lambda (x) (* x x)) (list 1 2 3 4 5 6)) that uses a lambda inline and returns (1 4 9 16 25 36) when evaluated. |
| (or arg1, arg2, . . . argN) | At least two arguments are required. Return the first evaluation that is non nil (true). If all arguments evaluate to nil (false), then return nil. This expression short circuits. |
| (quote arg) | Return arg without evaluation. |
| (set! sym arg) | Set the value of sym to arg in the environment structure. The variable at sym must already be defined. |

Stork Procedures

| | |
|---|---|
| (atom? arg) | Is arg an atom? Return arg if true, otherwise return nil. |
| (concur arg1 . . . argN) | Evaluate each argument concurrently. Return results in the same order as the expressions. |
| (cons arg1 arg2) | Return a new list where arg1 is the head and arg2 is the tail. |
| (empty? arg) | Is arg an empty list? Return true or nil. |
| (eq? arg1 arg2) | Is arg1 and arg2 the same object in memory? |
| (equal? arg1 arg2) | Do the two arguments have equal value? Return true or nil. |
| (error "msg") | Escape processing with a "msg" as the error message. |
| (eval arg) | Evaluate arg as an expression. |
| (list arg1 . . . argN) | Return a list containing arg1 . . . argN. |
| (list? arg) | Is arg a list? Return arg if true, otherwise return nil. |
| (map proc lis) | Map the procedure over the given list. See details below under "The map( ) Procedure". |
| (not arg) | Return true if arg is nil, otherwise return nil. |
| (num? arg) | Is arg a number? Return arg if true, otherwise return nil. |
| (pair? arg) | Is arg a pair? Return arg if true, otherwise return nil. |
| (println arg) | Print the string representation of arg to the system log. |
| (string arg) | Return a string representation of arg. In JVM based languages, this is equivalent to the toString( ) method. |
| (string? arg) | Is arg a string? |
| stringConcat(arg1 . . . argN) | Concatenate the string representation of each argument into one string. |
| (substring str start end) | Return the substring starting and start and ending at end, which is the first character that is NOT part of the string. |
| (sym? arg) | Is arg a symbol? |
| (head arg) | Return the head of the list arg. |
| (tail arg) | Return the tail of the list arg. |

```
The map ( ) Procedure
;Return a new list by mapping the given "lis" argument to
;a new set of values transformed with the "proc" function.
(define (map proc lis)
(if (not (list? lis))
(error "Invalid map call. Argument is not a List."))
(cond
((empty? lis) '( ))
(else (cons (proc (head lis)) (map proc (tail lis))))
)
)
```

The elements of ADL may be immutable. Procedures may create new expressions from other expressions, but all strings, numbers, symbols, and lists may be immutable.

An s-expression may be classically defined as an atom or an expression of the form (x . y) where x and v are s-expressions. The second, recursive part of the definition may represent an ordered pair so that s-expressions are effectively binary trees. ADL may use an abbreviated notation (like most modern s-expression notations) to represent lists in s-expressions, so that (x y z) stands for (x . (y . (z. nil)))

The ADL Application

The ADL application may be a non-blocking design. The requester may submit an ADL expression (e.g., an ADL script) to be evaluated, and an environment of procedures and variables, and a continuation call for when the result is ready. This approach may allow processing to be suspended until sub-processing is completed, which may also be suspended until some external event is achieved.

Figure 2:
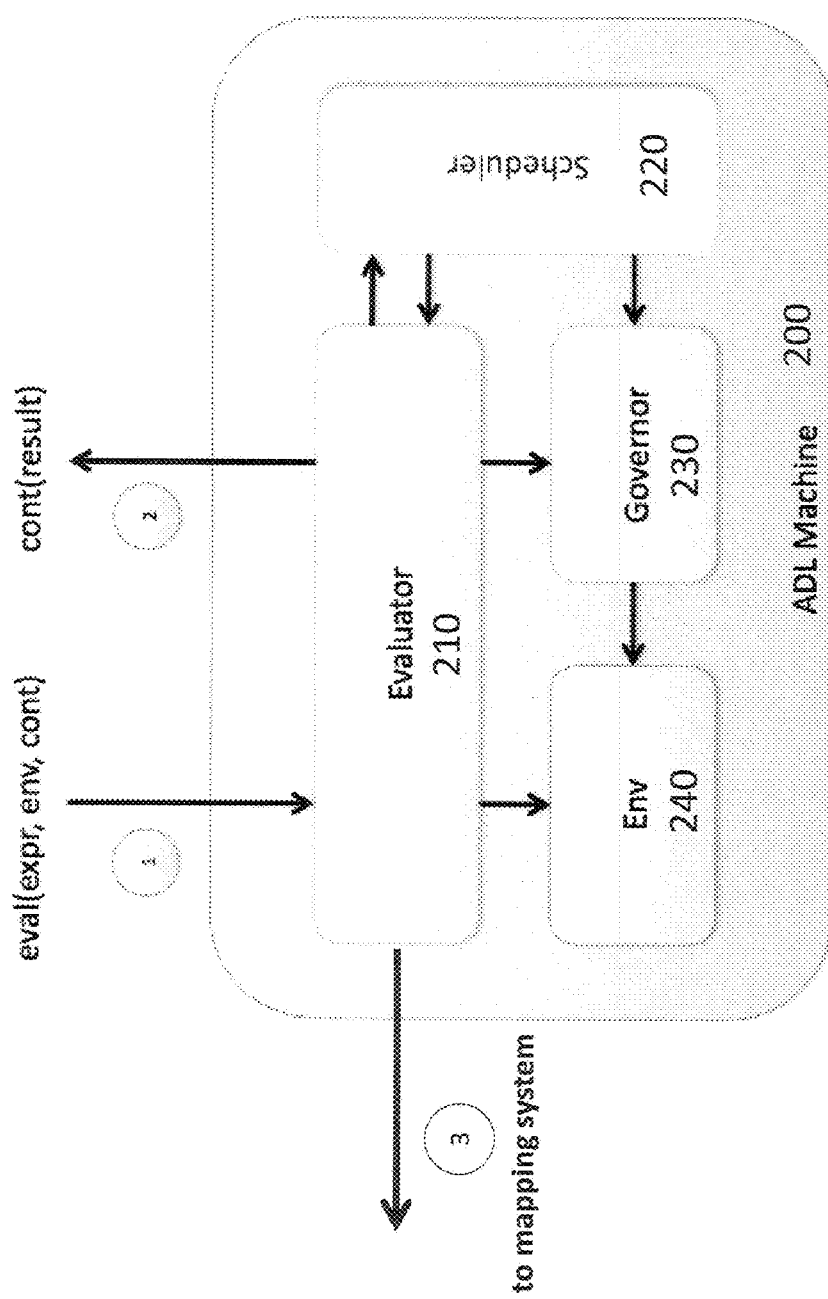
FIG. 2 is an application dialog, language (ADL) application according to an embodiment of the invention.

FIG. 2 is an ADL application 200 according to an embodiment of the invention. The ADL application 200 may include at least three modules that may work together to achieve an overall non-blocking execution of an ADL expression externally from the ADL application 200 and/or within a session environment 240: an evaluator module 210, a scheduler module 220, and a governor module 230. The data to be read may enter the ADL application 200 from an external process at step 1 of FIG. 2 and a result may be provided to the external process at step 2 in FIG. 2. The evaluator module 210 may evaluate an expression, but if the expression contains sub-expressions (known as procedures in Lisp), the evaluator module 210 may submit the expression to the scheduler module 220 to be run in the future (asynchronously) from a pool of threads. If the expression does not contain sub-expressions, it may be sent out for execution at step 3 of FIG. 2. For example, the expression may be executed according to the systems and methods described in related U.S. patent application Ser. No. 12/829,680. Some expressions may be executed within the session environment 240 and/or by the evaluator module 210. The evaluator module 210 and the scheduler module 220 may check their execution with the governor module 230, which may prevent any one session from abusing its use of resources.

Figure 3:
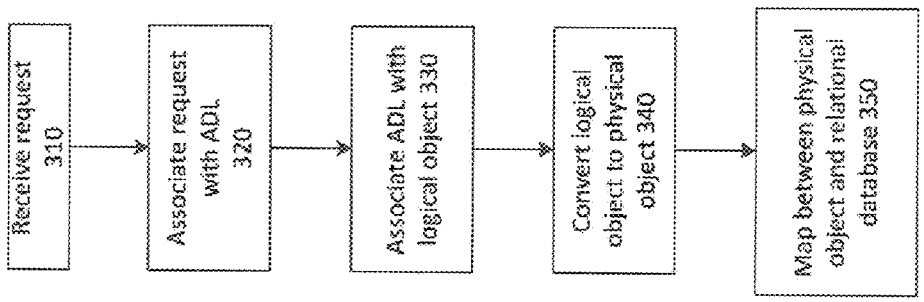
FIG. 3 is a mapping process according to an embodiment of the invention.

FIG. 3 is a mapping process 300 according to an embodiment of the invention. In 310, a request is received at the server 110, for example from a client computer 140. In 320, the request may be associated with an ADL application 200, and in 330 the ADL application 200 may be associated to a logical object. The ADL application 200 may perform tasks such as those described with respect to FIG. 4 below to facilitate a response to the request. In 340, the server 110 may convert the logical object to a physical object. In 350, the server 110 may map between the physical object and a relational database (e.g., database 130).

Figure 4:
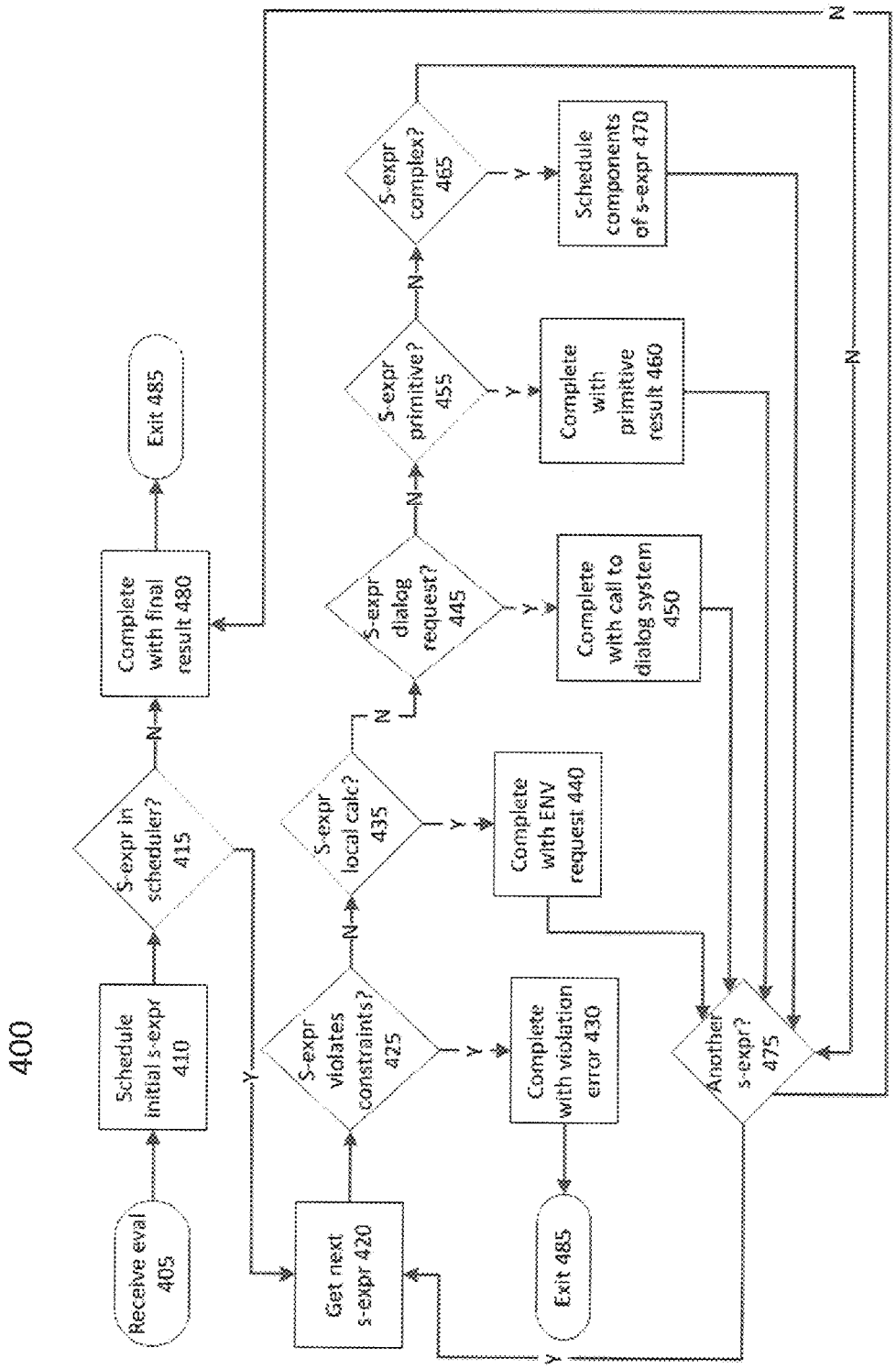
FIG. 4 is an ADL process according to an embodiment of the invention.

FIG. 4 is an ADL process 400 which may be carried out by the ADL application 200 according to an embodiment of the invention. Through the process 400, the evaluator module 210 may break the request into one or more to-do items and pass these items to the scheduler module 220, which may schedule the items for processing.

In 405, the evaluator module 210 may receive data to be evaluated (step 1 of FIG. 2). The data may be a request comprising one or more s-expressions. In 410, the evaluator module 210 may schedule an initial s-expression from the data. In 415, the evaluator module 210 may determine whether there are presently any s-expressions scheduled for execution by the scheduler module 220. If not, in 480 the process 400 may complete with a final result (step 2 of FIG. 2), and in 485 the process 400 may end.

Otherwise, in 420 the evaluator module 210 may get the next s-expression from the data. In 425, the evaluator module 210 may pass this s-expression to the governor module 230. The governor module 230 may check execution to prevent any individual session from abusing resources of the ADL application 200 to ensure that security or resource violations do not occur. If the governor module 230 detects a violation, for example because execution would exceed specified security or resource constraints, it may notify the evaluator module 210, and in 430 the evaluator module 210 may complete processing of the s-expression with a violation error return and the process 400 may exit 485. If there is no error, in 475 the evaluator module 210 may determine whether there are any more s-expressions to evaluate. If so, in 420 the evaluator module 210 may get the next s-expression from the scheduler module 220. If not, in 480 the process 400 may complete with a final result (step 2 of FIG. 2), and in 485 the process 400 may end.

If the governor module 230 does not detect a violation, in 435 the evaluator module 210 may analyze the s-expression to determine whether it can be calculated locally by the ADL application 200 in the session environment 240. If it can, in 440 the evaluator module 210 may complete processing of the s-expression with a request for execution by the session environment 240, which may then process the s-expression. In 475, the evaluator module 210 may determine whether there are any more s-expressions to evaluate. If so, in 420 the evaluator module 210 may get the next s-expression from the scheduler module 220. If not, in 480 the process 400 may complete with a final result (step 2 of FIG. 2), and in 485 the process 400 may end.

If the s-expression will not be processed in the session environment 240, in 445 the evaluator module 210 may analyze the s-expression to determine whether it can be calculated externally after a dialog request. If so, in 450 the evaluator module 210 may complete processing of the s-expression with a call to a dialog system (step 3 of FIG. 2). In 475, the evaluator module 210 may determine whether there are any more s-expressions to evaluate. If so, in 420 the evaluator module 210 may get the next s-expression from the scheduler module 220. If not, in 480 the process 400 may complete with a final result (step 2 of FIG. 2), and in 485 the process 400 may end.

It the s-expression will not be processed by the dialog system, in 455 the evaluator module 210 may analyze the s-expression to determine whether it is a primitive request that can be executed by the evaluator module 210 itself. If so, in 460 the evaluator module 210 may complete processing of the s-expression and return a primitive result. In 475, the evaluator module 210 may determine whether there are any more s-expressions to evaluate. If so, in 420 the evaluator module 210 may get the next s-expression from the scheduler module 220. If not, in 480 the process 400 may complete with a final result (step 2 of FIG. 2), and in 485 the process 400 may end.

If the s-expression will not be processed by the evaluator module 210, in 465 the evaluator module 210 may analyze the s-expression to determine whether it is a complex request that should be executed by external resources. If so, in 470 the evaluator module 210 may pass the contents of the s-expression to the scheduler module 220 for scheduling. In 475, the evaluator module 210 may determine whether there are any more s-expressions to evaluate. If so, in 420 the evaluator module 210 may get the next s-expression from the scheduler module 220. If not, in 480 the process 400 may complete with a final result (step 2 of FIG. 2), and in 485 the process 400 may end.

The process 400 may thus allow multiple client requests to be performed using the ADL application 200 before a result is returned. The following example script may be executed according to this process 400.

An Example Script

The following example is a simple read of name, phoneNumber, and emailAddress from the entity identified as com.catavolt.mk.test.case002.domain.Customer. The data to be read enters the ADL application 200 at step 1 of FIG. 2 and a result is provided at step 2 in FIG. 2. The example illustrates a number of features; the script is conversational and resumes an existing session based on a cryptographic hash of a session key; a procedure is composed (using begin) of three other procedures: createEditorModel, openEditorModel, and readEditorModel; session state is conditionally defined and maintained using the procedures if not, defined?, and define: a request number field rqsNr is computed each time the script is run; and finally, the script ends with a list literal that contains the request number and the read result. The last expression of a script determines the result, so the list literal of the example is returned to the caller through a continuation every time the script is evaluated.

```
(resumeSession '(sessionHandle "d41d8cd98f00b204e9800998ecf8427e")
                '(callProps nil)
    (begin
        (if (not (defined? dh))
            (define dh (createEditorModel '(domainClassName
                                "com.catavolt.mk.test.case002.domain.Customer")
                                '(callProps nil)))
        )
        (if (not (defined? oemr))
            (define oemr (openEditorModel dh
                            '(mode read)
                            '(objectId "129")
                            '(projection ("name" "phoneNumber" "emailAddress"))
                            '(callProps nil)))
        )
        (if (not (defined? remr))
            (define remr (readEditorModel dh
                            '(callProps nil)))
        )
        (if (not (defined? rqsNr)) (define rqsNr 0))
        (set! rqsNr (+ rqsNr 1))
        (list rqsNr remr)
    )
)
```

The Evaluator Module 210

The ADL application 200 may be implemented as an actor in Scala using the Akka framework. The design may take advantage of the built-in and highly scalable Akka runtime for asynchronous processing. The following code snippet is an example Machine class illustrating method signatures which may be involved in a non-blocking evaluator module 210.

```
type Continuation = (Either[Throwable, Any]) => Unit
private[mk] class Machine extends Actor with ActorLogging {
    private eval(pExpr: Any, pEnv: Env, pCont: Continuation): NotUsed
    private def evalArgs(pArgs: List[Any], pEnv: Env, pCont:
        Continuation): NotUsed
    private def evalProc(pList: List[Any], pEnv: Env, pCont:
        Continuation): NotUsed
    private def runEval(pExpr: Any, pEnv: Env, pSender: ActorRef):
        NotUsed
}
```

The runEval( ) Method

The runEval( ) method may be the entry point to the recursive evaluation process. It may receive an expression, environment, and continuation that correspond to the main entry point (step 1 of FIG. 2). The implementation may set up a continuation object that may be used to complete the process with either a success or a failure.

```
private def runEval(pExpr: Any, pEnv: Env, pSender: ActorRef):
    NotUsed = {
    val mainCont: Continuation = (result) => {
        result match {
            case Left(e) => pSender ! Status.Failure(e)
            case Right(v) => pSender ! Result(v)
        }
    }
    eval(pExpr, pEnv, mainCont)
    NotUsed
}
```

The eval( ) Method

The eval( ) method may be the main program loop (i.e., 320-350 of FIG. 3) and may run repeatedly until all expressions and sub-expressions are evaluated, or until an exception halts the process. The eval method may reveal the simplistic power of s-expressions and the ADL language. The entire language may be built upon types of String, Decimal, Boolean, Sym, and List.

```
private eval(pExpr: Any, pEnv: Env, pCont: Continuation): NotUsed = {
    try {
        pExpr match {
            case string: String => pCont(Right(string))
            case decimal: BigDecimal => pCont(Right(decimal))
            case boolean: Boolean => pCont(Right(boolean))
            case sym: Sym => pEnv.find(sym) match {
                case None => pCont(Left(new
                    MachineException("Not found: " + sym)))
                case Some(v) => pCont(Right(v))
            }
            case list: List[_] => list match {
                case Nil => pCont(Right(Nil))
                case _ => self ! CallProc(list, pEnv, pCont)
            }
            case other => pCont(Left(new MachineException("Invalid:
                " + pExpr)))
        }
    } catch {
        case exc => pCont(Left(new MachineException("Unexpected",
            exc)))
    }
    NotUsed
}
```

The evalProc( ) Method

The evalProc( ) method may be used to invoke procedures, which may be the only higher level expression supported, all other expressions may be atoms. The system of evaluation may be applicative order. The first element of the list may evaluate to a procedure defined by the language. The remaining list elements (the tail) may be evaluated and may all be defined after evaluation. The procedure associated with the first element may then be applied to the arguments from the remaining list elements.

```
private def evalProc(pList: List[Any], pEnv: Env, pCont: Continuation):
    NotUsed = {
    def exitPoint: Continuation = (result) => {
        governor.exitProc(pList)
        pCont(result)
    }
    try {
```

```
        if (pList == Nil) {
            pCont(Right(Nil)) // An empty list evaluates to an empty
                list
        } else {
            val cont: Continuation = (evalResult) => {
                evalResult match {
                    case Left(exc) => pCont(Left(exc))
                    case Right(args) => args match {
                        case (proc: Proc) :: args =>
                            overnor.enterProc(pList)
                            proc(args, pEnv, this, exitPoint)
                        case other =>
                            pCont(Left(new
                                MachineException("Invalid: " +
                                evalResult)))
                    }
                }
            }
            evalArgs(pList, pEnv, cont)
        }
    } catch {
        case exc => pCont(Left(new MachineException("Unexpected",
            exc)))
    }
    NotUsed
}
```

The evalArgs( ) Method

The evalArgs( ) method may be used to evaluate arguments before they are applied within the evalProc( ) method described above. Each argument may be evaluated individually and asynchronously if it involves a sub-expression. Finally, when all arguments are known, the continuation may be called to apply the procedure to these arguments.

```
private def evalArgs(pArgs: List[Any], pEnv: Env, pCont: Continuation):
NotUsed = {
    try {
        if (pArgs == Nil) {
            pCont(Right(Nil))
        } else {
            val iter = pArgs.iterator
            var buffer = ListBuffer[Any]( )
            // Eval first element
            eval(iter.next( ), pEnv, cont)
            // Eval next element on completion of prev element
            def cont: Continuation = (result) => {
                result match {
                    case Left(e) =>
                        pCont(Left(e))
                    case Right(v) =>
                        buffer.append(v)
                        if (iter.hasNext) {
                            eval(iter.next( ), pEnv, cont)
                        } else {
                            pCont(Right(buffer.toList))
                        }
                }
            }
        }
    } catch {
        case exc => pCont(Left(new MachineException("Unexpected
            ", exc)))
    }
    NotUsed
}
```

The Scheduler Module 220

The scheduler module 220 in the Machine class described above may be built on the Akka framework. The scheduling details that determine when a procedure will run, and on what thread the procedure will run, may be determined by the Akka runtime. In order to use the Akka scheduling, the ADL application 200 may implement the receive method to handle the asynchronous processing.

Expressions may be submitted for scheduling through an actor send method. The eval( ) method shown above may use the self ! CallProc(list, pEnv, pCont) statement to schedule an asynchronous evaluation of a sub-expression.

The ADL application 200 may be activated by the scheduler module 220 by invoking its receive method. One embodiment of a basic receive method is shown below. The two messages which may be essential to the operation of the ADL application 200 are Eval and CallProc.

```
def receive: PartialFunction[Any, Unit] = {
    case message => try {
        message match {
            case CallProc(list, env, cont) =>
                evalProc(list, env, cont)
            case Eval(x, env) => env match {
                case None => runEval(x, Env( ), sender)
                case Some(v) => runEval(x, v, sender)
            }
            case Status.Failure(e) =>
                log.error(e, "Machine received unhandled
                    failure")
            case u =>
                sender ! Status.Failure(new
                    MachineException("Unknown: " + u))
        }
    } catch {
        case exc => sender ! Status.Failure(new
            MachineException("Unexpected", exc))
    }
}
```

The Governor Module 230
The Governor Protocol

The governor module 230 may contain the necessary protocol to ensure that maximum allowances are not exceeded for at least the following metrics: elapsed running time, call depth, number of calls, number of object references, and size allocations.

```
trait Governor {
    def decRef(pValue: Any)
    def enterProc(pExpr: List[Any])
    def exitProc(pExpr: List[Any])
    def incRef(pValue: Any)
    def println(pLine: String)
    def printStatus
}
```

Procedure calls may be checked with the governor module 230 at the entry points and exit points using enterProc( ) and exitProc( ) as shown above in the sample code for evalProc( ). The governor module 230 may use these calls to track the elapsed running time, number of calls, and call depth. The enterProc( ) and exitProc( ) procedures may make calls to incRef( ) and decRef( ) so that object references and size allocations may be tracked as arguments move in and out of scope with expressions. The concur procedure, as defined above, may dispatch work concurrently. In this ease, the call depth tracking may suffice for "call width" tracking as well.

The methods incRef( ) and decRef( ) may be called any time an object is held or released (respectively) through a reference. This may allow the governor module 230 to track the number of object references and size allocations. There may be at least three scenarios where reference counting need to occur: when arguments are passed to a sub-expression, when a cons procedure creates a pair, and when a value is held by the Env object.

The only output available to ADL scripts may be a simple print in procedure for system logging and debugging. This procedure may route its output through the governor module 230 to ensure that the maximum log output for a session is not exceeded. The printStatus method may be an internal method used for debugging and may not be available to ADL scripts during execution.

Generalizing Reference Counting in Terms of Expressions

Figure 5:
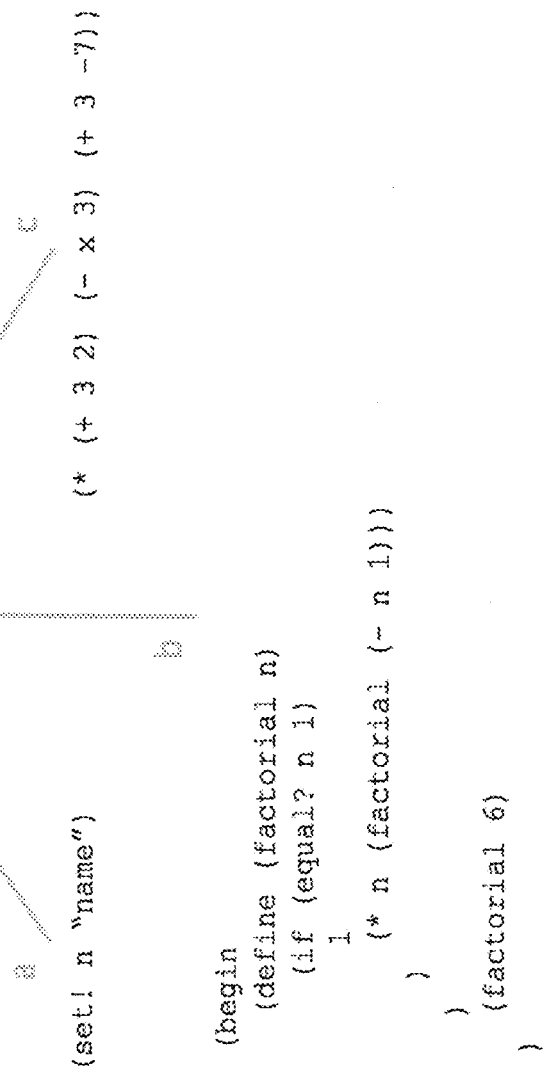
FIG. 5 is a general definition of s-expressions according to an embodiment of the invention.

The simplicity of s-expressions and the recursive nature of evaluating expressions may make it easier to reason about reference counting. FIG. 5 is a general definition of s-expressions 500 according to an embodiment of the invention. This definition 500 may indicate that all expressions other than atoms may be evaluated recursively. This one point may be used to reason about governance in terms of expressions. For example, the elements of expressions may be atoms and expressions. The elements of expressions may be immutable. Elements may be referenced in nested expressions, so elements passed to nested expressions may be actively counted and uncounted as they move in and out of scope. The cons operator may create a reference to the tail element that may need to be counted. A head element that is no longer referenced may need to uncount its tail reference. Elements bound to the Env object may have acquired a new reference and may need to be counted. Likewise, an element unbound from the Env object may have lost a reference and may need to be uncounted. An element that is no longer referenced may be eligible to have its memory reclaimed. In the reference implementation and implementations based on the JVM, that may mean the object is left for garbage collection. An expression that is evaluated and not used may leave an element that is not referenced. The element may be eligible to have its memory reclaimed.

According to the reasoning based on the definition 500, some interesting scenarios may be realized. For example, a variable n may be changed. The previous value stored at n may be unbound from the Env object and may be uncounted. The new value at n may be bound and counted. See element "a" of FIG. 5 for an example.

In another example, a complex expression may be evaluated. The begin procedure may cause an expression to be bound to the Env object under the factorial symbol. The nested expressions under define may be counted and may remain as active references because they were bound transitively through the Env object. The actual call (factorial 6) may not be used, therefore its result may no longer be referenced and may be eligible to have its memory reclaimed. See element "b" of FIG. 5 for an example.

In another example, a computation may be made. During computation the operator and integer objects may have been active and referenced. At completion however, the final result and all intermediate results may no longer be referenced and may be eligible to have their memory reclaimed. See element "c" of FIG. 5 for an example.

Deployment Scenarios

The ADL application 200 may be implemented in process if the application server 110 has a structured web services API, or it can be implemented out of process as a services broker.

Figures 6A, 6B:
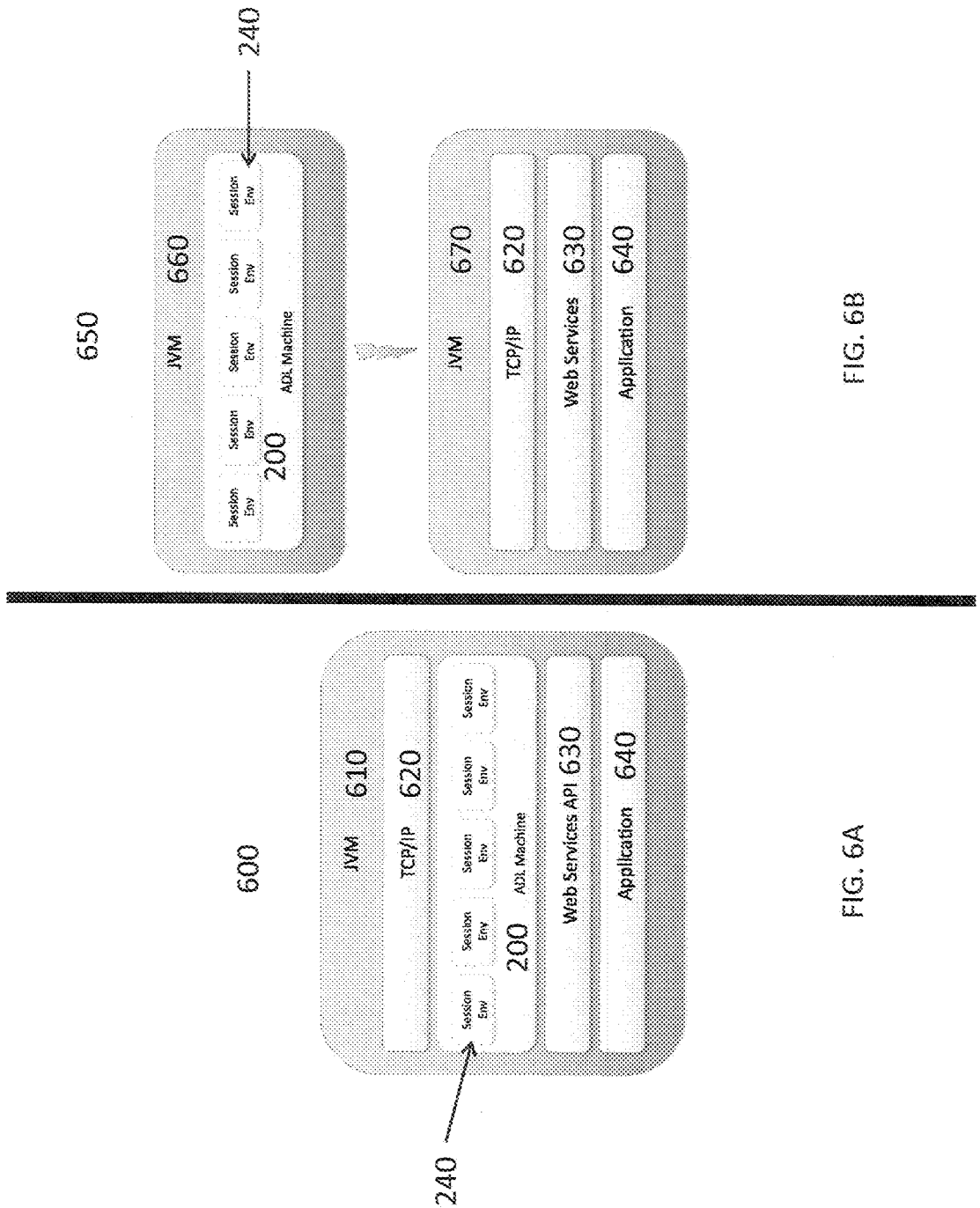
FIG. 6A is an in-process ADL application implementation according to an embodiment of the invention.
FIG. 6B is an out-of-process ADL application implementation according to an embodiment of the invention.

FIG. 6A is an in-process ADL application 200 implementation 500 according to an embodiment of the invention. In this implementation 600, the ADL application 200 may be implemented within a JVM environment 610 which may also include TCP/IP 620, web services API 630, and application 640 modules.

FIG. 6B is an out-of-process ADL application 200 implementation 650 according to an embodiment of the invention. In this implementation 650, the ADL application 200 may be implemented within a JVM environment 660 by itself, and a separate JVM environment 670 may include TCP/IP 620, web services API 630, and application 640 modules.

In either scenario 600, 650, conversational applications may be supported through the notion of a session. Each session may have its own ADL environment 240 that may preserve state between process-to-process invocations. An invocation may look up the session environment 240 and then may pass it through on the eval(expr, env, cont) call shown in FIGS. 2-3. All processing within an ADL application 200 may be isolated to its environment therefore the session may be isolated to its session environment 240. When the result is ready, the continuation (callback) may be invoked to complete processing.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. Thus, the present embodiments should not be limited by any of the above-described embodiments.

In addition, it should be understood that any figures which highlight the functionality and advantages are presented for example purposes only. The disclosed methodology and system are each sufficiently flexible and configurable such that they may be utilized in ways other than that shown.

Further, the purpose of any Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. An Abstract of the Disclosure is not intended to be limiting as to the scope of the present invention in any way.

Although the term "at least one" may often be used in the specification, claims and drawings, the terms "a", "an", "the", "said", etc. also signify "at least one" or "the at least one" in the specification, claims and drawings.

Additionally, the terms "including", "comprising" or similar terms in the specification, claims and drawings should be interpreted as meaning "including, but not limited to."

Finally, it is the applicant's intent that only claims that include the express language "means for" or "step for" be interpreted under 35 U.S.C. 212, paragraph 6. Claims that do not expressly include the phrase "means for" or "step for" are not to be interpreted under 35 U.S.C. 212, paragraph 6.

The invention claimed is:

1. A method for simplifying object mapping for external interfaces for a computer system, comprising:

performing processing associated with receiving at least two client requests for action from an external interface, the external interface comprising a human being or a computer program, wherein the at least two client requests are combined in an application dialogue language (ADL) script, wherein each client request is evaluated sequentially or concurrently in a governed and non-blocking technique;

performing processing associated with associating each client request to a logical object in order to minimize a representational gap between the client request and a physical object using the logical object, wherein the associating comprises accepting an entity identifier and a property name and validating that the client request is a query request, wherein the logical object comprises a dialogue process and a collection of metadata that describes an entity definition, wherein the dialogue process comprises a query subroutine comprising the query request and processing the query request to return a dialogue response, wherein the dialogue response comprises a list of dialogue records of corresponding values from the physical object if a successful query occurs, and a redirection is returned if a non-successful recoverable query occurs, wherein the dialogue response also comprises a value comprising: value, exception, or the redirection, wherein the redirection is constructed with the entity identifier to a new dialogue model that can be used to recover from an error;

performing processing associated with converting the logical object to a physical object that resides in an object relational mapping using information from the query request;

performing processing associated with mapping between the physical object that resides in the object relational mapping and a database; and performing processing associated with responding to each query request using the object relational mapping in order to simplify the external interface by minimizing the representational gap between the external interface and the physical object using the logical object.

2. The method of claim 1, wherein the ADL comprises an evaluator configured to evaluate the client request.

3. The method of claim 2, wherein the ADL further comprises a scheduler configured to schedule any sub-routines in the client request.

4. The method of claim 3, wherein:
the evaluator passes the client request to the scheduler; and
the scheduler schedules the sub-routines in the client request.

5. The method of claim 3, wherein the ADL further comprises a governor to prevent any one session from abusing a resource.

6. The method of claim 5, wherein abusing the resource comprises violating a security constraint, exceeding a resource capacity, or a combination thereof.

7. The method of claim 1, wherein the ADL runs on top of an application programming interface (API).

8. The method of claim 1, wherein the ADL comprises a non-blocking design.

9. The method of claim 1, wherein the ADL is in communication with one or more web services.

10. The method of claim 9, wherein the computer system comprises the web services.

11. The method of claim 9, wherein the web services are housed in a remote computer, and the ADL is configured to communicate with the web services via a network.

12. The method of claim 1, wherein the multiple client requests are performed using the ADL efficiently and without security or resource violations.

13. The method of claim 1, wherein the database comprises formatted text.

14. The method of claim 1, wherein the database comprises: SQL, ASCII, or XML, or any combination thereof.

15. The method of claim 1, wherein the dialogue process further comprises a subroutine comprising: read, write, method, or navigate, or any combination thereof.

16. The method of claim 1, wherein the dialogue response is a dialogue record of corresponding values from the physical object if a successful read occurs; and a redirection is returned if a non-successful recoverable read occurs.

17. The method of claim 1, wherein the dialogue response is a dialogue record of corresponding values from the physical object if a successful write occurs; and a redirection is returned if a non-successful recoverable write occurs.

18. The method of claim 1, wherein the dialogue response is a dialogue record of corresponding values from the physical object if a successful method occurs; and a redirection is returned if a non-successful recoverable method occurs.

19. The method of claim 1, wherein the dialogue response is a redirection if a successful navigate occurs; and an exception is returned if a non-successful navigate occurs.

20. The method of claim 1, wherein the physical object comprises a collection of data or logic.

21. A system for simplifying object mapping for external interfaces for a computer system, comprising:
a processor in communication with a database, the processor configured for:
performing processing associated with receiving at least two client requests for action from an external interface, the external interface comprising a human being or a computer program, wherein the at least two client requests are combined in an application dialogue language (ADL) script, wherein each client request is evaluated sequentially or concurrently in a governed and non-blocking technique;

performing processing associated with associating each client request to a logical object in order to minimize a representational gap between the client request and a physical object using the logical object, wherein the associating comprises accepting an entity identifier and a property name and validating that the client request is a query request, wherein the logical object comprises a dialogue process and a collection of metadata that describes an entity definition, wherein the dialogue process comprises a query subroutine comprising the query request and processing the query request to return a dialogue response, wherein the dialogue response comprises a list of dialogue records of corresponding values from the physical object if a successful query occurs, and a redirection is returned if a non-successful recoverable query occurs, wherein the dialogue response also comprises a value comprising: value, exception, or the redirection, wherein the redirection is constructed with the entity identifier to a new dialogue model that can be used to recover from an error;

performing processing associated with converting the logical object to a physical object that resides in an object relational mapping using information from the query request;

performing processing associated with mapping between the physical object that resides in the object relational mapping and a database; and performing processing associated with responding to each query request using the object relational mapping in order to simplify the external interface by minimizing the representational gap between the external interface and the physical object using the logical object.

22. The system of claim 21, wherein the ADL comprises an evaluator configured to evaluate the client request.

23. The system of claim 22, wherein the ADL further comprises a scheduler configured to schedule any sub-routines in the client request.

24. The system of claim 23, wherein:
the evaluator passes the client request to the scheduler; and
the scheduler schedules the sub-routines in the client request.

25. The system of claim 23, wherein the ADL further comprises a governor to prevent any one session from abusing a resource.

26. The system of claim 25, wherein abusing the resource comprises violating a security constraint, exceeding a resource capacity, or a combination thereof.

27. The system of claim 23, wherein the ADL runs on top of an application programming interface (API).

28. The system of claim 21, wherein the ADL comprises a non-blocking design.

29. The system of claim 21, wherein the ADL is in communication with one or more web services.

30. The system of claim 29, wherein the computer system comprises the web services.

31. The system of claim 29, wherein the web services are housed in a remote computer, and the ADL is configured to communicate with the web services via a network.

32. The system of claim 21, wherein the multiple client requests are performed using the ADL efficiently and without security or resource violations.

33. The method of claim 1, wherein the dialogue process further comprises a subroutine comprising: read, write, method, or navigate, or any combination thereof.

34. The method of claim 33, wherein the subroutine further comprises: performing processing associated with returning a dialogue response.

35. The method of claim 34, wherein the dialogue response includes a combination of value, exception, or redirection.

36. The system of claim 1, wherein the dialogue process further comprises a subroutine comprising: read, write, method, or navigate, or any combination thereof.

37. The system of claim 36, wherein the subroutine further comprises: performing processing associated with returning a dialogue response.

38. The method of claim 37, wherein the dialogue response includes a combination of value, exception, or redirection.

39. The system of claim 21, wherein the database comprises formatted text.

40. The system of claim 21, wherein the database comprises: SQL, ASCII, or XML, or any combination thereof.

41. The system of claim 21, wherein the dialogue process further comprises a subroutine comprising: read, write, method, or navigate, or any combination thereof.

42. The system of claim 21, wherein the dialogue response is a dialogue record of corresponding values from the physical object if a successful read occurs; and a redirection is returned if a non-successful recoverable read occurs.

43. The system of claim 21, wherein the dialogue response is a dialogue record of corresponding values from the physical object if a successful write occurs; and a redirection is returned if a non-successful recoverable write occurs.

44. The system of claim 21, wherein the dialogue response is a dialogue record of corresponding values from the physical object if a successful method occurs; and a redirection is returned if a non-successful recoverable method occurs.

45. The system of claim 21, wherein the dialogue response is a redirection if a successful navigate occurs; and an exception is returned if a non-successful navigate occurs.

46. The system of claim 21, wherein the physical object comprises a collection of data or logic.

* * * * *